United States Patent
Lansot et al.

(10) Patent No.: US 12,122,977 B2
(45) Date of Patent: Oct. 22, 2024

(54) LUBRICANT COMPOSITION FOR WATER-BASED COMPOSITIONS

(71) Applicant: TOTALENERGIES ONETECH, Courbevoie (FR)

(72) Inventors: Jean-Yves Lansot, Paris la Défense (FR); Benjamin Swoboda, Orgeval (FR); Jayachandran Perumalsamy, Tamil Nadu (IN)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

(21) Appl. No.: 18/015,358

(22) PCT Filed: Jul. 12, 2021

(86) PCT No.: PCT/EP2021/069251
§ 371 (c)(1),
(2) Date: Jan. 10, 2023

(87) PCT Pub. No.: WO2022/013117
PCT Pub. Date: Jan. 20, 2022

(65) Prior Publication Data
US 2023/0272301 A1   Aug. 31, 2023

(30) Foreign Application Priority Data
Jul. 15, 2020 (EP) .................... 20305810

(51) Int. Cl.
| | |
|---|---|
| *C10M 173/00* | (2006.01) |
| *C09K 8/22* | (2006.01) |
| *C10M 105/04* | (2006.01) |
| *C10M 109/02* | (2006.01) |
| *C10M 111/06* | (2006.01) |
| *C10M 129/74* | (2006.01) |
| *C10N 30/04* | (2006.01) |
| *C10N 30/18* | (2006.01) |

(52) U.S. Cl.
CPC ............ *C10M 173/00* (2013.01); *C09K 8/22* (2013.01); *C10M 105/04* (2013.01); *C10M 109/02* (2013.01); *C10M 111/06* (2013.01); *C10M 129/74* (2013.01); *C09K 2208/34* (2013.01); *C10M 2203/022* (2013.01); *C10M 2207/0406* (2013.01); *C10M 2207/044* (2013.01); *C10N 2030/04* (2013.01); *C10N 2030/18* (2013.01)

(58) Field of Classification Search
CPC .... C09K 8/22; C09K 2208/34; C10M 173/00; C10M 105/04; C10M 109/02; C10M 111/06; C10M 2203/022; C10M 2207/406; C10M 2230/04
See application file for complete search history.

(56) References Cited

U.S. PATENT DOCUMENTS

| | | | |
|---|---|---|---|
| 2,816,073 A | 12/1957 | Stratton | |
| 5,919,738 A | 7/1999 | Norfleet et al. | |
| 6,165,940 A * | 12/2000 | Aven .................. | A01N 43/90 504/118 |
| 2007/0265171 A1* | 11/2007 | Javora ................ | C09K 8/524 507/90 |
| 2010/0305009 A1 | 12/2010 | Westfechtel et al. | |
| 2020/0048525 A1 | 2/2020 | Germanaud et al. | |

FOREIGN PATENT DOCUMENTS

| | | | |
|---|---|---|---|
| EP | 1 728 844 A1 | 12/2006 | |
| EP | 2 084 245 A1 | 8/2009 | |
| EP | 2 368 967 A1 | 9/2011 | |
| WO | WO99/66006 A1 | 12/1999 | |
| WO | WO-0101777 A1 * | 1/2001 | ............ A01N 43/40 |
| WO | WO2008/058664 A8 | 5/2008 | |
| WO | WO2014/033762 A1 | 3/2014 | |
| WO | WO2014/102237 A1 | 7/2014 | |
| WO | WO2016/185046 A1 | 11/2016 | |

OTHER PUBLICATIONS

Tween 81 Data Sheet by IRO Group, Inc. (Year: 2023).*
Safety Data Sheet of Shellsol T (Year: 2019).*
International Search Report, issued in PCT/EP2021/069251, dated Oct. 13, 2021.
Written Opinion of the International Searching Authority, issued in PCT/EP2021/069251, dated Oct. 13, 2021.

* cited by examiner

*Primary Examiner* — Aiqun Li
(74) *Attorney, Agent, or Firm* — Birch, Stewart, Kolasch & Birch, LLP

(57) ABSTRACT

A lubricant composition includes (a) a hydrocarbon oil including at least 30% wt of isoparaffins, based on the total weight of the hydrocarbon oil, and (b) an alkoxylated natural oil. A method of using the lubricant composition in a water-based composition, in particular a water-based mud, to improve the lubricity and/or to reduce the foaming properties of the water-based composition is also disclosed.

20 Claims, No Drawings

LUBRICANT COMPOSITION FOR WATER-BASED COMPOSITIONS

TECHNICAL FIELD

The present invention relates to a biodegradable composition improving the lubricity of water-based compositions, such as water-based muds whether during drilling or during formation fracturing.

The invention also relates to the use of this biodegradable composition in a water-based composition, such as water-based mud as additive among other functional additives suitable for the application envisaged for said mud whether in drilling or in fracturing. Finally, the additive-treated water-based mud obtained after adding all its components is particularly suitable for offshore and onshore drilling operations.

BACKGROUND OF THE INVENTION

Water-based compositions can find uses in drilling or in fracturing, as well as in rolling, such as aluminium cold-rolling. Water-based muds are particularly used in drilling applications.

Certain sites, such as large civil engineering projects, use large quantities of fluids containing additives improving their lubricant properties and/or resistance to friction which aid the proper operation of the tools used with these fluids, in particular for machining, piercing and/or drilling, where there are major problems with friction. However, these fluids used in large quantities are released in the form of rocky spoil after use, which means that they must not pose any danger to the environment. Often this rocky spoil must be retreated after use. Therefore, a major objective is to provide fluids that are completely biodegradable and can be released into the environment. This applies in particular to drilling fluids and muds, both offshore and onshore.

It is known that drilling is of prime importance in petroleum exploitation and that drilling is becoming deeper and deeper. Drilling technology is constantly evolving, whether onshore or offshore, especially deep offshore, but also, more recently, in horizontal or deflected drilling, where, by successive inclinations of one or two degrees, the trajectory of the well becomes curved, which makes it possible to reach horizontal deposits at least more than a kilometre or even more than ten kilometres from the wellhead.

The frictional forces that are exerted are therefore becoming greater and greater, hence the increased importance of the lubricant properties of the drilling fluid and of its effect on resistance to friction at the level of the drilling tools.

As is well known, the drilling technique uses a drill bit fixed on the end of drill pipes, which, when driven in rotation, bores the well by grinding the rocks.

As drilling progresses, drill bits of smaller and smaller diameter are used, and at each step the well is consolidated with a steel tube called "casing", which is lowered inside the hole, and then fixed with cement.

During drilling, a drilling fluid is circulated, with injection into the drill bit and expulsion from the latter into the contact zone with the rock, and is then brought back up to the top of the well through the annular space separating the drill pipes from the "casing".

This fluid generally performs the following main functions:
cooling the drill bit,
reducing the metal/metal frictional forces, between the casing and the drill pipes, and metal/rock frictional forces, both at the level of the drill bit and in the annular zone, since the fluid comes up laden with particles of ground rock, called "cuttings" in the art, discharging the rock debris to the exterior,
creating a pressure on the walls of the hole, to prevent their collapse, and
balancing the pressures between the bottom of the well and the surface, in order to maintain control of the well and prevent a blowout.

In the case of deep-water offshore drilling, the water temperatures encountered, close to 4 to 5° C., require good control of the viscosity of the drilling fluids at these low temperatures.

Various types of drilling fluids or muds have been used in the past, such as water-based fluids, containing water and additives for adjusting their density and their rheological properties, oil-based fluids, and emulsions of the water-in-oil type or inverted emulsions, of the oil-in-water type, as described in particular in U.S. Pat. No. 2,816,073.

In water-based muds (WBMs), the drilling fluid is water; the water-based muds are generally reserved for applications that are not very technical and for very shallow onshore or offshore drilling (a few metres).

As in the case of fluids containing a high proportion of water, various problems arise such as excessive acidity or basicity of these muds, which can give rise to blocking of the tools, adjustment of the density and viscosity but also problems of friction at the level of the drilling tool and tool-rock contacts. This last-mentioned point raises the problem of the lubricating capacity of a water-based mud and improvement of its lubricity with additives called lubricity additives and/or anti-wear additives and/or also anti-friction additives.

Improvement of the lubricity of muds has been the subject of many works and various ways of measuring the lubricity of these water-based muds have been envisaged.

In document US2010/0305009, the inventors suggest the use of oligoglycerol esters in water-based muds containing more than 70% by weight of water. More particularly, these oligoglycerol esters contain from 20 to 45% by weight of glycerol, from 20 to 40% by weight of diglycerol, from 10 to 20% by weight of triglycerol, from 1 to 10% by weight of tetraglycerol and 0.5 to 5% by weight of pentaglycerol in the form of esters of fatty acids comprising from 2 to 18 carbon atoms, mono- and polyunsaturated, preferably of oleic, linoleic and/or linolenic acid or of pine oil (tall oil) fatty acids.

In document WO2014/102237, the inventors suggest the use of a compound selected from the group consisting of (i) the diglycerol mono- and diesters, (ii) the acids and the ester derivatives of monocarboxylic fatty acids comprising 16 to 22 carbon atoms per chain, (iii) the acids and the ester derivatives of resin acids, (iv) the monoesters of polyol comprising more than 4 hydroxylated groups and of carboxylic fatty acids comprising from 6 to 12 carbon atoms, saturated and unsaturated by at least one unsaturation, and (v) the mono- and polyalkoxylated esters of saturated and unsaturated dicarboxylic acids comprising from 6 to 12 carbon atoms, for improving the lubricity of water-based muds.

In document WO99/66006, the inventors suggest the use of compound containing at least one amphiphilic non-ionic compound obtained by reacting at least one vegetable oil or fatty acid as such or in a polymerized state on at least one amino alcohol, in order to improve the lubricity of water-based muds. These kinds of compounds have the drawback of forming a foam.

There is a need to provide a lubricant composition for water-based compositions such as water-based muds with reduced foaming properties or that does not form foam at all.

SUMMARY OF THE INVENTION

The present invention relates to a lubricant composition comprising:
(a) A hydrocarbon oil comprising at least 30% wt of isoparaffins, based on the total weight of the hydrocarbon oil,
(b) An alkoxylated natural oil.

Preferably, the alkoxylated natural oil has a HLB ranging from 6 to 15, preferably from 7 to 13, more preferably from 8 to 10.

Preferably, the alkoxylated natural oil is selected from ethoxylated vegetable oils.

Preferably, the alkoxylated natural oil is liquid at 25° C.

Preferably, the vegetable oil is selected from rapeseed oil, soybean oil, sunflower oil, palm oil, coconut oil, peanut oil, castor oil, and mixtures thereof.

Preferably, the hydrocarbon oil comprises at least 50% wt of isoparaffins, preferably at least 75% wt of isoparaffins, more preferably at least 90% wt of isoparaffins, based on the total weight of the hydrocarbon oil.

According to an embodiment, the composition comprises:
(a) from 0.1 to 40% wt of the hydrocarbon oil,
(b) from 60 to 99.9% wt of the alkoxylated natural oil, based on the total weight of the composition.

According to an embodiment, the lubricant composition further comprises a surfactant.

Preferably, the surfactant is selected from non-ionic surfactants, preferably selected from alkoxylated fatty acids, alkoxylated fatty alcohols, alkoxylated fatty amines, alkylpolyglucosides, alkoxylated phosphate esters, alkoxylated esters, alcanolamides, and mixtures thereof.

Preferably, the lubricant composition comprises:
(a) from 0.1 to 15% wt, preferably from 1 to 10% wt, of the hydrocarbon oil,
(b) from 60 to 95% wt, preferably from 65 to 80% wt, of the alkoxylated natural oil, and
(c) from 5 to 40% wt, preferably from 10 to 30% wt, of the surfactant, based on the total weight of the composition.

The invention is also directed to the use of the composition according to the invention, in a water-based composition, in particular in a water-based mud.

Preferably, the composition is used in order to improve the lubricity of the water-based composition, in particular of the water-based mud, and/or in order to reduce the foaming properties of the water-based mud.

The composition of the invention allows to both reduce the friction coefficient and reduce the foaming properties of a water-based mud, even when the composition comprises small amounts of isoparaffinic hydrocarbon oil.

Finally, the invention is directed to a water-based mud comprising water, a lubricant composition according to the invention and optionally an alkaline compound.

Preferably, the water-based mud of the invention comprises from 1 to 10% by volume of the composition according to any one of claims 1 to 10, based on the total volume of the water-based mud.

The lubricant composition of the invention has satisfying lubricant properties. Indeed, the lubricant composition of the invention can reduce the friction coefficient of the water-based composition wherein it is introduced, in particular of the water-based mud wherein said lubricant composition is introduced.

Additionally, the composition of the invention has a reduced foaming capacity.

DETAILED DESCRIPTION OF THE INVENTION

The present invention concerns a lubricant composition comprising:
(a) A hydrocarbon oil comprising at least 30% wt of isoparaffins, based on the total weight of the hydrocarbon oil,
(b) An alkoxylated vegetable oil.

Hydrocarbon Oil

The hydrocarbon oil defined in the invention comprises at least 30%, preferably at least 50% wt of isoparaffins, preferably at least 75% wt of isoparaffins, more preferably at least 90% wt of isoparaffins, even more preferably at least 95% wt of isoparaffins, and advantageously at least 98% wt of isoparaffins, based on the total weight of the hydrocarbon oil.

In one embodiment, the isoparaffinic compounds contained in the hydrocarbon oil used in the invention have 12 to 30 carbon atoms, preferably 13 to 24 carbon atoms, more preferably 14 to 20 carbon atoms.

In one embodiment of the invention, the isoparaffinic compounds contained in the hydrocarbon oil used in the invention have a molar mass in the range of from 170 to 285 g/mol, preferably in the range of from 180 to 270 g/mol, and more preferably in the range of from 195 to 260 g/mol.

The hydrocarbon oil of the invention preferably has a weight content of normal paraffins equal to or lower than 10%, preferably equal to or lower than 5%, and advantageously equal to or lower than 2%.

The hydrocarbon oil of the invention advantageously comprises a majority amount of isoparaffins and a minority amount of normal paraffins. These isoparaffins are advantageously non-cyclic isoparaffins. Preferably, the hydrocarbon oil of the lubricant composition has a weight ratio of isoparaffins to normal paraffins of at least 12:1, preferably at least 15.1 and more preferably at least 20:1. Still further advantageously, the hydrocarbon oil of the lubricant composition of the invention does not contain any normal paraffins.

In one embodiment, the hydrocarbon oil used in the invention preferably has a weight content of isoparaffins in the range of 90 to 100% and weight content of normal paraffins in the range of 0 to 10%, preferably 95 to 100% isoparaffins and 0 to 5% of normal paraffins and more preferably 98 to 100% of isoparaffins and 0 to 2% of normal paraffins.

In one embodiment, the hydrocarbon oil of the lubricant composition of the invention preferably has a weight content of isoparaffins in the range of 90 to 100% and a content of normal paraffins in the range of 0 to 10%, more preferably 95 to 100% of isoparaffins selected from among alkanes having 12 to 30 carbon atoms, preferably 13 to 19 carbon atoms, more preferably 14 to 18 carbon atoms.

In one embodiment, the hydrocarbon oil used in the invention comprises:
isoparaffins having 15 carbon atoms and isoparaffins having 16 carbon atoms in a combined amount ranging from 80 to 98 weight % relative to the total weight of the hydrocarbon oil; or isoparaffins having 16 carbon atoms, isoparaffins having 17 carbon atoms and isoparaffins having 18 carbon atoms in a combined amount ranging from 80 to 98 weight % relative to the total weight of the hydrocarbon oil; or isoparaffins having 17 carbon atoms and isoparaffins having 18 carbon atoms in a combined amount ranging from 80 to 98 weight % relative to the total weight of the hydrocarbon oil.

In one preferred embodiment of the invention the hydrocarbon oil used in the lubricant composition of the invention comprises isoparaffins having 16 carbon atoms and isoparaffins having 17 carbon atoms and isoparaffins having 18 carbon atoms in a combined amount ranging from 80 to 98 weight % relative to the total weight of the hydrocarbon oil.

The hydrocarbon oil of the lubricant composition of the invention preferably has a weight content of naphthenic compounds equal to or less than 3%, preferably equal to or less than 1%, more preferably equal to or less than 0.5% and further preferably equal to or less than 100 ppm, based on the total weight of the hydrocarbon oil.

In another preferred embodiment, the hydrocarbon oil of the lubricant composition of the invention has a weight content of isoparaffins in the range of 90 to 100%, a weight content of normal paraffins in the range of 0 to 10% and a weight content of naphthenes equal to or less than 1%. Preferably, the hydrocarbon oil has a weight content of isoparaffins in the range of 95 to 100%, from 0 to 5% of normal paraffins and a weight content of naphthenes equal to or less than 0.5%. More preferably it has a weight content of isoparaffins in the range of 98 to 100%, from 0 to 2% of normal paraffins and a weight content of naphthenes equal to or less than 100 ppm.

The hydrocarbon oil used in the lubricant composition of the invention is advantageously free of aromatic compounds. By "free" it is meant a weight content of aromatic compounds equal to or less than 500 ppm, preferably equal to or less than 300 ppm, more preferably equal to or less than 100 ppm, further preferably equal to or less than 50 ppm and advantageously equal to or less than 20 ppm, measured via UV spectrometry for example.

The weight content of isoparaffins, normal paraffins, naphthenes and/or aromatics of the hydrocarbon oil can be determined using methods well-known to persons skilled in the art. For example, nonlimiting mention can be made of gas phase chromatography.

In another preferred embodiment, the hydrocarbon oil of the lubricant composition has a weight content of isoparaffins in the range of 90 to 100%, a weight content of normal paraffins in the range of 0 to 10%, a weight content of naphthenes equal to or lower than 1% and a weight content of aromatic compounds equal to or less than 500 ppm. Preferably, the hydrocarbon oil has a weight content of isoparaffins ranging from 95 to 100%, 0 to 5% of normal paraffins, a weight content of naphthenes equal to or lower than 0.5% and a weight content of aromatic compounds equal to or less than 300 ppm, preferably less than 100 ppm, more preferably less than 50 ppm and advantageously less than 20 ppm. Preferably also, the hydrocarbon oil has a weight content in the range of 95 to 100% of isoparaffins, 0 to 5% of normal paraffins and a weight content of aromatic compounds equal to or less than 100 ppm. More preferably, it has a weight content of isoparaffins in the range of 98 to 100% and 0 to 2% of normal paraffins, a weight content of naphthenes equal to or less than 100 ppm and a weight content of aromatic compounds equal to or less than 100 ppm.

The hydrocarbon oil used in the lubricant composition of the invention also preferably has an extremely low weight content of sulfur compounds, typically equal to or less than 5 ppm, preferably equal to or less than 3 ppm, and more preferably equal to less than 0.5 ppm, at a level that is too low for detection by conventional low sulfur content analysers.

The hydrocarbon oil used in the lubricant composition of the invention also preferably has a flash point equal to or higher than 110° C., preferably equal to or higher than 120° C. and more preferably equal to or higher than 140° C. in accordance with standard EN ISO 2719. A high flash point, typically higher than 110° C., inter alia allows the overcoming of safety issues during storage and transport since the hydrocarbon oil will be less flammable.

The hydrocarbon oil also preferably has a vapour pressure at 20° C. equal to or lower than 0.01 kPa.

In one embodiment, the hydrocarbon oil used in the invention also preferably has a flash point equal to or higher than 110° C. in accordance with standard EN ISO 2719 and a vapour pressure at 20° C. equal to or lower than 0.01 kPa. Preferably, the hydrocarbon oil has a flash point equal to or higher than 120° C. and a vapour pressure at 20° C. equal to or lower than 0.01 kPa. More preferably, it has a flash point equal to or higher than 140° C. and a vapour pressure at 20° C. equal to or lower than 0.01 kPa.

The hydrocarbon oil used in the invention has boiling temperatures, a flash point and a vapour pressure allowing problems of flammability, odour and volatility to be overcome.

The hydrocarbon oil of the lubricant composition of the invention also preferably has a kinematic viscosity at 40° C. equal to or less than 5 cSt, preferably equal to or less than 4.5 cSt and more preferably equal to or less than 4 cSt in accordance with standard EN ISO 3104.

Method for Obtaining the Hydrocarbon Oil:

Said hydrocarbon oil compositions can be obtained in the following manner. The hydrocarbon oil of the invention can be a hydrocarbon fraction derived from the conversion of biomass.

By derived from conversion of biomass it is meant a hydrocarbon fraction produced from raw materials of biological origin.

Preferably, the hydrocarbon fraction of biological origin is obtained by a process comprising steps of hydrodeoxygenation (HDO) and isomerization (ISO). The hydrodeoxygenation step (HDO) leads to decomposition of the structures of biological esters or triglyceride constituents, to removal of oxygenated, phosphorus- and sulfur-containing compounds, and to hydrogenation of olefinic bonds. The product derived from the hydrodeoxygenation reaction is isomerized. A fractionating step can preferably follow after the hydrodeoxygenation and isomerization steps. Advantageously, the fractions of interest are then subjected to hydrotreatment and distillation steps to obtain the desired specifications of the hydrocarbon oil of the invention.

This HDO/ISO process is implemented on raw biological feedstock, also called biomass or raw material of biological origin, selected from the group formed by vegetable oils, animal fats, fish oils and mixtures thereof. Suitable raw materials of biological origin are for example rapeseed oil, canola oil, tall oil, sunflower seed oil, soybean oil, hemp oil, olive oil, flax oil, mustard oil, palm oil, groundnut oil, castor oil, coconut oil, animal fats such as tallow, recycled food fats, raw materials derived from genetic engineering, and biological raw materials produced from microorganisms such as algae and bacteria. Condensation products, esters or other derivatives obtained from raw biological materials can also be used as raw materials.

Preferably, the raw material of biological origin is an ester or triglyceride derivative. This material is first subjected to a hydrodeoxygenation step (HDO) to decompose the structure of the constituent esters or triglycerides and to remove oxygenated, phosphorus- and sulfur-containing compounds concomitantly with hydrogenation of the olefinic bonds. This hydrodeoxygenation step (HDO) of the raw material of biological origin is followed by isomerization of the product obtained, leading to branching of the hydrocarbon chain and to improved properties of paraffin at low temperature.

At the HDO step, hydrogen and the raw material of biological origin are passed over a hydrodeoxygenation catalytic bed simultaneously, in the same direction or in counter-current. At the HDO step, the pressure and temperature are respectively between 20 and 150 bar and between 200 and 500° C. Known, conventional hydrodeoxygenation catalysts are used for this step. Optionally, the raw material of biological origin, before the HDO step, can be subjected to pre-hydrogenation under mild conditions to prevent secondary reactions of double bonds.

The product resulting from the hydrodeoxygenation reaction is subjected to an isomerization step (ISO) at which hydrogen and said product, and optionally a mixture of n-paraffins, are passed over isomerization catalytic beds simultaneously, in the same direction or in counter current. At the ISO step, the pressure and temperature are respectively between 20 and 150 bar and between 200 and 500° C. Known, conventional isomerization catalysts are used at this step.

Additionally, secondary processes can also be applied (e.g. intermediate mixing, scavenging or the like).

The product resulting from the HDO/ISO steps can optionally be fractionated to obtain the fractions of interest.

Various HDO/ISO processes are described in the literature. Application WO 2014/033762 describes a process comprising a pre-hydrogenation step, a hydrodeoxygenation step (HDO) and an isomerization step conducted in counter current flow. Patent application EP 1728844 describes a method for producing hydrocarbon compounds from a mixture of compounds of vegetable and animal origin. This method comprises a pre-treatment step of the mixture to remove contaminants, e.g. alkali metal salts, followed by a hydrodeoxygenation step (HDO) an isomerization step. Patent application EP 2084245 describes a method for producing a hydrocarbon mixture, which can be used as diesel oil or in a diesel oil composition, via hydrodeoxygenation of a mixture of biological origin containing fatty acid esters optionally in a mixture with free fatty acids, for example vegetable oils such as sunflower seed oil, rapeseed oil, canola oil, palm oil or pine oil, followed by hydroisomerization on specific catalysts. Patent application EP 2368967 describes said method and the product obtained with this method. Application WO 2016/185046 describes a method for obtaining a hydrocarbon oil used according to the invention wherein the hydrocarbon oil is obtained with a catalytic hydrogenation process at a temperature of 80 to 180° C. and at a pressure of 50 to 160 bar from deoxygenated and isomerized biological feedstock.

Advantageously, the raw material of biological origin contains less than 15 ppm of sulfur, preferably less than 8 ppm, more preferably less than 5 ppm and further preferably less than 1 ppm in accordance with standard EN ISO 20846. Ideally, the raw material of biosourced origin used as feedstock does not contain sulfur.

Before the hydrotreatment step, a pre-fractionating step can be performed. A narrower-cut fraction fed into the hydrogenation unit allows a narrow-cut fraction to be obtained on leaving the unit. The boiling points of pre-fractionated fractions are between 220 and 330° C. whilst fractions which have not been pre-fractionated typically have boiling points between 150 and 360° C.

The deoxygenated, isomerized feedstock derived from the HDO/ISO process is hydrogenated.

The hydrogen used in the hydrogenation unit is typically highly purified hydrogen. By highly purified hydrogen it is meant hydrogen having purity higher than 99% for example, even if other grades could also be used.

The hydrogenation step is conducted by means of catalysts. Standard hydrogenation catalysts can either be bulk or supported, and may comprise the following metals: nickel, platinum, palladium, rhenium, rhodium, nickel tungstate, nickel-molybdenum, molybdenum, cobalt-molybdenum. The supports can be silica, alumina, silica-alumina or zeolites.

One preferred catalyst is a nickel-based catalyst on an alumina support having a specific surface area which varies between 100 and 200 $m^2/g$ of catalyst, or a bulk nickel catalyst. Conditions for hydrogenation are typically the following:

Pressure: 50 to 160 bar, preferably 80 to 150 bar and more preferably 90 to 120 bar;

Temperature: 80 to 180° C., preferably 120 to 160° C. and more preferably 150 to 160° C.;

Liquid Hourly space velocity (LHSV): 0.2 to 5 $hr^{-1}$, preferably 0.4 to 3 $hr^{-1}$ and more preferably 0.5 to 0.8 $hr^{-1}$;

Hydrogen treatment rate: adapted to the above-mentioned conditions and possibly reaching 200 $Nm^3$/tonnes of feedstock to be treated.

The temperature in the reactors is typically between 150 and 160° C. with a pressure of about 100 bar, whilst the liquid hourly space velocity is about 0.6 $hr^{-1}$ with a treatment rate adapted as a function of the quality of the feedstock to be treated and the parameters of the first hydrogenation reactor.

Hydrogenation can also take place in one or more reactors in series. The reactors may comprise one or more catalytic beds. The catalytic beds are generally fixed catalytic beds.

The hydrogenation process is preferably carried out in two or three reactors, preferably in three reactors and more preferably in three reactors in series.

The first reactor is used for scavenging of sulfur-containing compounds and hydrogenation of essentially all unsaturated compounds and up to about 90% of aromatic compounds. The product leaving the first reactor contains substantially no sulfur-containing compound. At the second stage i.e. in the second reactor hydrogen of the aromatics is continued and up to 99% of aromatics are thereby hydrogenated.

The third stage in the third reactor is a finishing stage allowing contents of aromatics to be obtained of 500 ppm or less, preferably 300 ppm or less, more preferably 100 ppm or less and further preferably 50 ppm or less, and ideally equal to or less than 20 ppm, even for products with high boiling point e.g. higher than 300° C.

It is possible to use a reactor comprising two, three or more catalytic beds. The catalysts can be in variable amounts possibly being different or essentially the same in each reactor; for three reactors, the amounts as a function of weight can be 0.05-0.5/0.10-0.70/0.25-0.85 for example, preferably 0.07-0.25/0.15-0.35/0.4-0.78 and more preferably 0.10-0.20/0.20-0.32/0.48-0.70.

It is also possible to use one or two hydrogenation reactors instead of three.

It is also possible that the first reactor is composed of twin reactors used alternately. This operating mode particularly allows facilitated loading and unloading of catalysts: when the first reactor comprises the catalyst that is first saturated (substantially all the sulfur is trapped on and/in the catalyst), this catalyst must be changed often.

A single reactor can also be used in which two, three or more catalytic beds are installed.

It may be necessary to insert quench boxes (to stifle the reaction) in the recycle system or between the reactors to cool the effluents from one reactor to another or from one catalytic bed to another, to control the temperatures and hydrothermal balance of each reaction. In one preferred embodiment, there are no cooling or quenching intermediates.

In one embodiment, the product resulting from the process and/or the separated gas(s) are at least partly recycled back into the feed system of the hydrogenation reactors. This dilution contributes towards maintaining the exothermicity of the reaction within controlled limits, in particular at the first stage. In addition, recycling allows heat exchange before the reaction and additionally better control over temperature.

The effluent from the hydrogenation unit chiefly contains the hydrogenated product and hydrogen. Flash separators are used to separate the effluents into a gas phase, mainly residual hydrogen, and a liquid phase mainly hydrogenated hydrocarbon fractions. This process can be carried out using three flash separators, one at high pressure, one at intermediate pressure and one at low pressure very close to atmospheric pressure.

The gaseous hydrogen collected data the top of the flash separators can be recycled back to the feed system of the hydrogenation unit, or to different stages in the hydrogenation units between the reactors.

In one embodiment, the end product is separated at atmospheric pressure. It is then fed directly into a vacuum fractionating unit. Preferably, fractionation is performed at a pressure of between 10 and 50 bar, and more preferably at about 30 bar.

Fractionation can be performed so that it is possible simultaneously to withdraw various hydrocarbon fluids from the fractionating column, and so that their boiling point is able to be predetermined.

By adapting the feedstock via the initial and final boiling points thereof, the hydrogenation reactors, separators and fractionating unit can therefore be directly connected without the need for intermediate vessels. This continuity between hydrogenation and fractionation allows optimised thermal integration associated with a reduction in the number items of equipment together with energy savings.

The hydrocarbon oil used in the composition of the invention is advantageously a hydrocarbon fraction having an initial boiling point and a final boiling point in the range of 230° C. to 340° C., preferably 235° C. to 330° C. and more preferably 240° C. to 325° C., further preferably 290 to 325° C., measured in accordance with standard ASTM D86. Preferably, the difference between the final boiling point and initial boiling point is equal to or less than 90° C., preferably equal to or less than 80° C., more preferably equal to or less than 70° C. and advantageously it is between 40 and 70° C. The hydrocarbon oil may comprise one or more fractions having distillation ranges lying within the above ranges.

Advantageously, the hydrocarbon oil used in the composition of the invention is fully saturated.

The hydrocarbon oil used in the composition of the invention advantageously has a weight content of isohexadecane equal to or less than 50%, based on the total weight of the hydrocarbon oil.

The hydrocarbon oil of the composition of the invention is ideally derived from treatment of raw materials of biological origin. The carbon of a biomaterial results from photosynthesis of plants and hence from atmospheric $CO_2$. Degradation (by degradation it is also meant end-of-life combustion/incineration) of these materials to $CO_2$ does not therefore contribute towards global warming since there is no increase in carbon emitted in the atmosphere. The $CO_2$ balance of biomaterials is therefore distinctly better and contributes towards reducing the carbon footprint of the products obtained (solely the energy required for manufacture must be taken into account). On the contrary, a material of fossil origin that has degraded to $CO_2$ will contribute towards increasing $CO_2$ levels and hence to global warming. The hydrocarbon oil used in the invention will therefore have a better carbon footprint than that of compounds obtained from a fossil source.

The term «bio-carbons» indicates that the carbon is of natural origin and is derived from a biomaterial as indicated below. Bio-carbon content and biomaterial content are expressions indicating the same value. A renewable material or biomaterial is an organic material in which the carbon is derived from recently fixed $CO_2$ (on human scale) via photosynthesis with the atmosphere. A biomaterial (Carbone 100% of natural origin) has a $^{14}C/^{12}C$ isotopic ratio greater than $10^{-12}$, typically about $1.2 \times 10^{-11}$, whilst a fossil material has a zero ratio. Isotopic $^{14}C$ is formed in the atmosphere and is therefore integrated via photosynthesis on a time scale of no more than a few tens of years. The half-life of $^{14}C$ is 5730 years. As a result, materials derived from photosynthesis, namely plants in general, necessarily have a maximum content of isotope $^{14}C$.

Determination of the content of biomaterial or bio-carbon is given in accordance with standards ASTM D 6866-12, method B (ASTM D 6866-06) and ASTM D 7026 (ASTM D 7026-04). Standard ASTM D 6866 concerns «Determining the Biobased Content of Natural Range Materials Using Radiocarbon and Isotope Ratio Mass Spectrometry Analysis», whilst standard ASTM D 7026 concerns «Sampling and Reporting of Results for Determination of Biobased Content of Materials via Carbon Isotope Analysis». The second standard mentions the first in the first paragraph thereof.

The first standard describes a test to measure the $^{14}C/^{12}C$ ratio of a sample and comparison with the $^{14}C/^{12}C$ ratio of a reference sample of 100% renewable origin, to give a relative percentage of C of renewable origin in the sample. The standard is based on the same concept as $^{14}C$ dating, but without applying dating equations. The ratio thus calculated is indicated as «pMC» (percent Modern Carbon). If the material to be analysed is a mixture of biomaterials and fossil materials (without radioactive isotope), the pMC value obtained is directly correlated with the quantity of biomaterial contained in the sample. The reference value used for $^{14}C$ dating is a value dating from the 1950s. The year 1950 was chosen on account of the existence of nuclear testing in the atmosphere which sent large amounts of isotopes into the atmosphere after this date. The 1950 reference corresponds to a pMC value of 100. Having regard to thermonuclear tests, the current value to be retained is about 107.5 (which corresponds to a correction factor of 0.93). The radiocarbon signature of a plant today is therefore 107.5. A signature of 54 pMC and 99 pMC therefore corresponds to a quantity of biomaterial in the sample of 50% and 93% respectively.

The hydrocarbon oil of the composition of the invention has biomaterial content of at least 90%. This content is advantageously higher, in particular equal to or higher than 95%, preferably equal to or higher than 98% and advantageously it is 100%.

In one embodiment, the $^{14}C/^{12}C$ isotopic ratio of the hydrocarbon oil used in the invention is between 1.15 and $1.2 \times 10^{-12}$.

In addition to a particularly high biomaterial content, the hydrocarbon oil of the composition of the invention has particularly good biodegradability. Biodegradation of an organic chemical product refers to reduction of the complexity of the chemical compounds through the metabolic activity of microorganisms. Under aerobic conditions, microorganisms convert organic substances to carbon dioxide, water and biomass. The OECD 306 method is used to evaluate the biodegradability of individual substances in seawater. According to this method, the hydrocarbon oil has biodegradability at 28 days of at least 60%, preferably at least 70%, more preferably at least 75% and advantageously at least 80%.

The OECD 306 method is the following:

For the closed bottle method, a predetermined amount of the substance to be tested is dissolved in a test medium at a concentration conventionally of 2-10 mg/L, one or more concentrations being used. The solution is kept in a filled, closed bottle away from light at a constant temperature in the range of 15-20° C. Degradation is monitored via analysis of oxygen over a period of 28 days. 24 bottles are used (8 for the substance to be tested, 8 for the reference compound and 8 for nutrients). All analyses are performed on several bottles. At least 4 determinations of dissolved oxygen are carried out (Day 0, 5, 15 and 20) using a chemical or electrochemical method.

In one particular embodiment of the invention, the hydrocarbon oil comprises:
- a weight content of isoparaffins in the range of 95 to 100%, preferably 98% to 100%, relative to the total weight of the hydrocarbon oil; and
- a weight content of normal paraffins equal to or less than 5% and preferably equal to or less than 2%, relative to the total weight of the hydrocarbon oil; and
- a weight content of naphthenic compounds equal to or lower than 0.5% and preferably equal to or less than 100 ppm, relative to the total weight of the hydrocarbon oil; and
- a weight content of aromatic compounds equal to or less than 300 ppm, preferably equal to or less than 100 ppm, more preferably equal to or less than 50 ppm and advantageously equal to or less than 20 ppm, relative to the total weight of the hydrocarbon oil.

Alkoxylated Vegetable Oil

The composition of the invention comprises one or more alkoxylated natural oil.

The alkoxylated natural oil can be selected from ethoxylated natural oil, propoxylated natural oil, and mixtures thereof, preferably from ethoxylated natural oil.

Preferably, the natural oil is selected from vegetable oil. Among vegetable oil, mention may be made of tallow oil, colza oil, sunflower oil, soya oil, flax oil, olive oil, palm oil, castor oil, wood oil, corn oil, squash oil, rapeseed oil, soybean oil, jojoba oil, sesame oil, walnut oil, hazelnut oil, almond oil, shea oil, macadamia oil, cotton oil, alfalfa oil, rye oil, safflower oil, peanut oil, coconut oil and copra oil, and mixtures thereof. Preferably, the vegetable oil is selected from rapeseed oil, soybean oil, sunflower oil, palm oil, coconut oil, peanut oil, castor oil, and mixtures thereof.

According to an embodiment, the alkoxylated natural oil has a HLB (hydrophilic-lipophilic balance) ranging from 4 to 18, preferably from 6 to 15, more preferably from 8 to 10.

According to an embodiment, the alkoxylated natural oil has from 5 to 30 alkylene oxide units, preferably from 15 to 25 alkylene oxide units (being noted that the alkylene oxide unit is a unit of formula —(R—O)—, wherein R is an alkylene radical having preferably from 1 to 6 carbon atoms, preferably from 2 to 3 carbon atoms). Preferably, the alkoxylated natural oil is an ethoxylated vegetable oil having from 5 to 30 ethylene oxide units, preferably from 15 to 25 ethylene oxide units (being noted that the ethylene oxide unit is a unit of formula —($CH_2$—$CH_2$—O)—).

Preferably, the alkoxylated natural oil is liquid at 20° C.

The alkoxylated natural oil used in the invention can be a non-ionic surfactant.

According to an embodiment of the invention, the alkoxylated natural oil can be obtained by alkoxylation of natural oil with an alkylene oxide. Preferably, the alkoxylated natural oil is an ethoxylated natural oil and the ethoxylation is carried out with ethylene oxide.

Alkoxylated natural oils used in the invention may be commercially available.

According to an embodiment, the lubricant composition of the invention comprises:
(a) from 0.1 to 40% wt of a hydrocarbon oil,
(b) from 60 to 99.9% wt of an alkoxylated natural oil,
based on the total weight of the lubricant composition.

According to an embodiment, the lubricant composition of the invention comprises:
(a) from 0.1 to 40% wt of a hydrocarbon oil, said hydrocarbon oil comprising at least 90% wt of isoparaffins based on the total of the hydrocarbon oil,
(b) from 60 to 99.9% wt of an ethoxylated vegetable oil, based on the total weight of the lubricant composition.

According to an embodiment, the lubricant composition further comprises a surfactant, different from the alkoxylated natural oil defined above. Preferably, said surfactant is selected from non-ionic surfactants, preferably selected from alkoxylated fatty acids, alkoxylated fatty alcohols, alkoxylated fatty amines, alkylpolyglucosides, alkoxylated phosphate esters, alkoxylated esters, alcanolamides, and mixtures thereof. As an example of surfactant, mention may be made of ethoxylated sorbitan esters.

According to an embodiment, the lubricant composition comprises:
(a) from 0.1 to 15% wt, preferably from 1 to 10% wt, of the hydrocarbon oil,
(b) from 60 to 95% wt, preferably from 65 to 80% wt, of the alkoxylated natural oil, and
(c) from 5 to 40% wt, preferably from 10 to 30% wt, of a non-ionic surfactant,
based on the total weight of the lubricant compositions.

According to an embodiment, the lubricant composition comprises:
(a) from 0.1 to 15% wt, preferably from 1 to 10% wt, of a hydrocarbon oil, said hydrocarbon oil comprising at least 90% wt of isoparaffins based on the total of the hydrocarbon oil,
(b) from 60 to 95% wt, preferably from 65 to 80% wt, of the ethoxylated vegetable oil, and (c) from 5 to 40% wt, preferably from 10 to 30% wt, of a non-ionic surfactant (different from the alkoxylated natural oil), based on the total weight of the lubricant compositions.

The present invention is also directed to the use of the lubricant composition of the invention in a water-based composition, preferably in order to improve the lubricity of the water-based composition and/or to reduce the foaming properties of the water-based composition. The water-based composition can be a water-based mud or a water-based lubricant for rolling applications.

According to a particular embodiment, the water-based composition of the invention is a water-based mud.

The lubricant composition can be added in an amount ranging from 1 to 10% by volume, preferably from 1 to 5% by volume, based on the total volume of the water-based composition.

The use of the invention consists preferably in introducing the lubricant composition of the invention into water of the water-based composition, preferably in an amount ranging from 1 to 10% by volume, preferably from 1 to 5% by volume, based on the total volume of the water-based composition.

According to a particular embodiment, the water-based composition is a water-based mud.

The invention is also directed to a water-based composition comprising water and the lubricant composition defined in the invention. According to an embodiment, the water-based composition comprises from 1 to 10% vol, preferably from 1 to 5% vol of the lubricant composition, based on the total volume of the water-based composition.

Finally, the invention is directed to a water-based mud comprising the lubricant composition of the invention. The water-based mud of the invention may further comprise additional additive(s) capable of adjusting the pH and/or the density and/or the viscosity and/or the pour point of the water-based mud.

According to an embodiment, the water-based mud comprises from 1 to 10% by volume, preferably from 1 to 5% by volume, of the lubricant composition, based on the total volume of the water-based mud.

According to an embodiment, the water-based mud comprises water, an alkaline compound, such as calcium carbonate ($CaCO_3$), and the lubricant composition of the invention.

EXAMPLES

The invention is now described with the help of the following examples, which are not intended to limit the scope of the present invention, but are incorporated to illustrate advantages of the present invention and best mode to perform it.

Example 1: Preparation of the Lubricant Compositions

Compositions have been prepared by mixing the ingredients listed in table 1 for each composition. The proportions are indicated in table 1 in percentage by weight, based on the total weight of the composition.

TABLE 1

|  | C1 | C2 | C3 | C4 | C5 |
|---|---|---|---|---|---|
| Water |  |  |  | 10 | 10 |
| hydrocarbon oil | 9 | 9 | 9 | 10 | 10 |
| Surfactant 1 |  | 20 |  |  | 10 |

TABLE 1-continued

|  | C1 | C2 | C3 | C4 | C5 |
|---|---|---|---|---|---|
| Surfactant 2 |  |  | 20 |  |  |
| Ethoxylated natural oil | 91 | 71 | 71 | 80 | 60 |

In table 1:

the hydrocarbon oil comprises at least 95% wt of isoparaffins, less than 20 ppm wt of aromatics and has an initial boiling point of 264° C. and a final boiling point of 306.8° C. according to ASTM D86.

Surfactant 1 is an ethoxylated sorbitan trioleate nonionic surfactant having a HLB of 9.5.

Surfactant 2 is an ethoxylated sorbitan trioleate nonionic surfactant having a HLB of 11.0.

The ethoxylated natural oil is an ethoxylated natural oil derived from rapeseed oil having a HLB 8.9.

Example 2: Preparation of the Water-Based Muds

A reference mud (Mref) comprises:
361.6 ppb of sea water,
0.35 ppb of sodium carbonate
0.5 ppb of sodium hydroxide
31.8 ppb of sodium chloride
2 ppb of modified starch
2 ppb of xanthan gum
7 ppb of $CaCO_3$—5 μm
14 ppb of $CaCO_3$—25 μm
15 ppb of $CaCO_3$—50 μm Water-based muds M1, M2, M3 and M4 have been prepared by mixing during 50 minutes the mud MRef with:
3% wt of a lubricant composition of example 1 (C1, C2 or C3), or
3% wt of the ethoxylated natural oil (same as used in lubricant compositions of example 1).

Compositions of the water-based muds that have been tested are described in table 2.

TABLE 2

|  | MRef | M1 | M2 | M3 | M4 |
|---|---|---|---|---|---|
| MRef | 100% wt | 97% wt | 97% wt | 97% wt | 97% wt |
| Ethoxylated natural oil |  | 3% wt |  |  |  |
| C1 |  |  | 3% wt |  |  |
| C2 |  |  |  | 3% wt |  |
| C3 |  |  |  |  | 3% wt |

Example 3: Measures of the Performances of the Water-Based Muds

Performances of the water-based muds prepared in example 2 have been tested:
BFR: before hot-rolling
AFR: after hot-rolling.

Hot-rolling is performed in a multimixer during 16 hours at 150° F. for a water-based mud volume of 1 barrel at a speed of 11500 rpm.

The friction coefficient is measured according to API RECOMMENDED PRACTICE 13B-1—Lubricity test OFITE. The principle of the test is the following: The standard lubricity coefficient test is run at 60 rpm with 150 in-lb of force (the equivalent of approximately 600 psi (4,137 kPa) pressure of the intermediate fluid) is applied to two hardened steel surfaces, a rotating ring and a stationary block.

Friction is measured as the coefficient of friction (p). The coefficient of friction between two solids is defined as the frictional force of the load or the force perpendicular to the surfaces. The coefficient of friction is independent of the apparent areas of contact as long as this area is not so small as to break through the film. The force to overcome friction will be the same for a small area as for a larger area. The force, F, required to slide the block and the ring surfaces across each other at a given rate is measured by the power required to turn the test ring shaft at a prescribed rate of revolutions per minute.

The Coefficient of Friction, $\mu$=meter reading/Load or Force.

Performances are detailed in table 3.

TABLE 3

|  | MRef | | M1 | | M2 | | M3 | | M4 | |
| --- | --- | --- | --- | --- | --- | --- | --- | --- | --- | --- |
|  | BFR | AFR | BFR | AFR | BFR | AFR | BFR | AFR | BFR | AFR |
| Mud weight, ppg | | | | | | | | | | |
| Friction Coefficient | | 0.23 | 0.18 | 0.12 | | 0.126 | | 0.108 | | 0.104 |
| Visual observations | | | | 20-25% foaming | | Very low foaming | | 10-15% foaming | | 10-15% foaming |

The results of table 3 show that the lubricant compositions of the invention C1, C2 and C3 allow providing a water-based mud having improved lubricant properties with reduced foaming properties.

In conclusion, the composition of the invention comprising the combination of a hydrocarbon oil comprising at least 30% wt of isoparaffins, based on the total weight of the hydrocarbon oil, and an alkoxylated natural oil allows reducing both the friction coefficient and the foaming properties of the resulting water-based composition.

The invention claimed is:

1. A lubricant composition comprising:
   (a) from 0.1 to 40% wt of a hydrocarbon oil comprising at least 30% wt of isoparaffins, based on the total weight of the hydrocarbon oil, wherein the hydrocarbon oil is a hydrocarbon fraction having an initial boiling point and a final boiling point in the range of 230° C. to 340° C.; and
   (b) from 60 to 99.9% wt of an alkoxylated natural oil, based on the total weight of the lubricant composition, wherein the hydrocarbon oil has a flash point equal to or higher than 110° C.

2. The composition according to claim 1, wherein the alkoxylated natural oil has a HLB ranging from 6 to 15.

3. The composition according to claim 1, wherein the alkoxylated natural oil is selected from ethoxylated vegetable oils.

4. The composition according to claim 1, wherein the alkoxylated natural oil is liquid at 25° C.

5. The composition according to claim 3, wherein the vegetable oil is selected from rapeseed oil, soybean oil, sunflower oil, palm oil, coconut oil, peanut oil, castor oil, and mixtures thereof.

6. The composition according to claim 1, wherein the hydrocarbon oil comprises at least 50% wt of isoparaffins, based on the total weight of the hydrocarbon oil.

7. The composition according to claim 1, further comprising a surfactant.

8. The composition according to claim 7, wherein the surfactant is selected from non-ionic surfactants.

9. The composition according to claim 8, wherein the non-ionic surfactants are selected from alkoxylated fatty acids, alkoxylated fatty alcohols, alkoxylated fatty amines, alkylpolyglucosides, alkoxylated phosphate esters, alkoxylated esters, alkanolamides, or mixtures thereof.

10. The composition according to claim 7, comprising:
    (a) from 0.1 to 15% wt of the hydrocarbon oil;
    (b) from 60 to 95% wt of the alkoxylated natural oil; and
    (c) from 5 to 40% wt of the surfactant,
    based on the total weight of the composition.

11. The composition according to claim 1, wherein the hydrocarbon oil comprises at least 75% wt of isoparaffins, based on the total weight of the hydrocarbon oil.

12. A method for preparing a water-based composition, the method comprising using the lubricant composition according to claim 1 as a component of the water-based composition.

13. The method according to claim 12, the method comprising a step of improving the lubricity of the water-based composition.

14. The method according to claim 12, the method comprising a step of reducing the foaming properties of the water-based composition.

15. A water-based mud comprising water, a lubricant composition according to claim 1 and optionally an alkaline compound.

16. The water-based mud according to claim 15, comprising from 1 to 10% by volume of the lubricant composition, based on the total volume of the water-based mud.

17. The water-based mud according to claim 15, wherein the lubricant composition comprises: (a) from 1 to 10% wt., of the hydrocarbon oil; (b) from 65 to 80% wt., of the alkoxylated natural oil; and (c) from 10 to 30% wt., of a surfactant, based on the total weight of the lubricant composition.

18. The water-based mud according to claim 15, wherein the alkoxylated natural oil is selected from ethoxylated vegetable oils.

19. The water-based mud according to claim 15, wherein the hydrocarbon oil comprises at least 90% wt of isoparaffins, based on the total weight of the hydrocarbon oil.

20. A lubricant composition comprising:
    (a) from 1 to 10% wt of a hydrocarbon oil comprising at least 30% wt of isoparaffins, based on the total weight of the hydrocarbon oil,
    (b) from 65 to 80% wt of an alkoxylated natural oil, and
    (c) from 10 to 30% wt, of a non-ionic surfactant,
    based on the total weight of the lubricant composition, wherein the hydrocarbon oil has a flash point equal to or higher than 110° C.

* * * * *